April 22, 1930. H. E. BUCKLEN 1,755,422
WINDMILL DRIVE
Filed Dec. 30, 1925 3 Sheets-Sheet 1
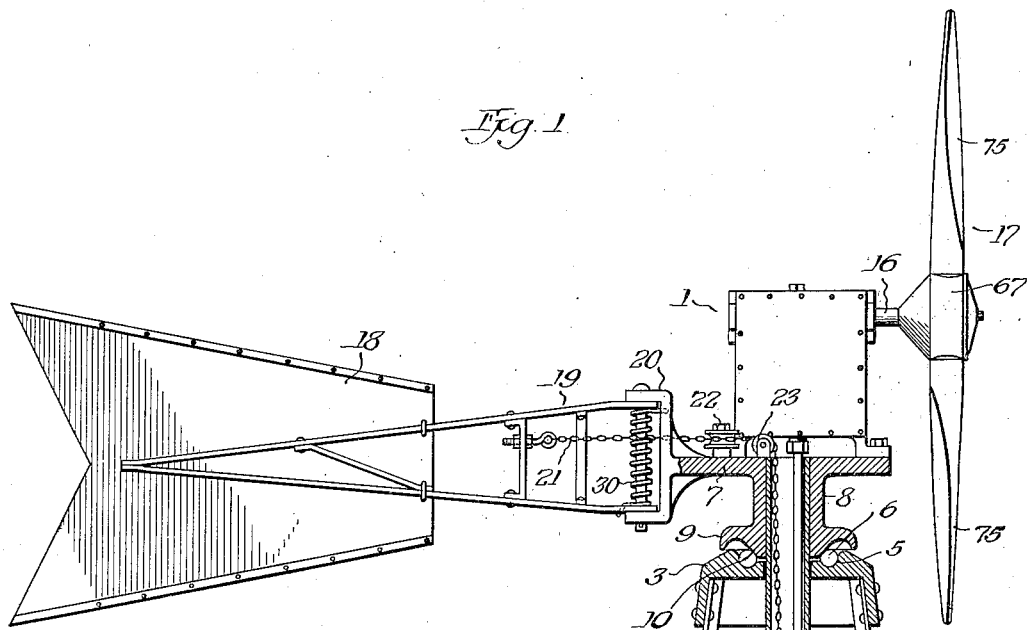
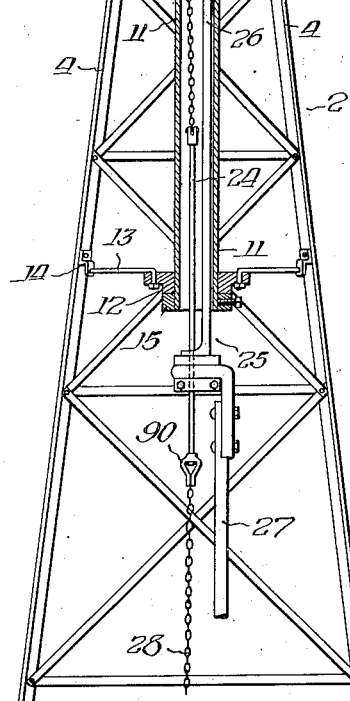
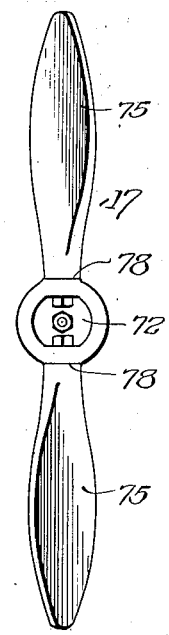

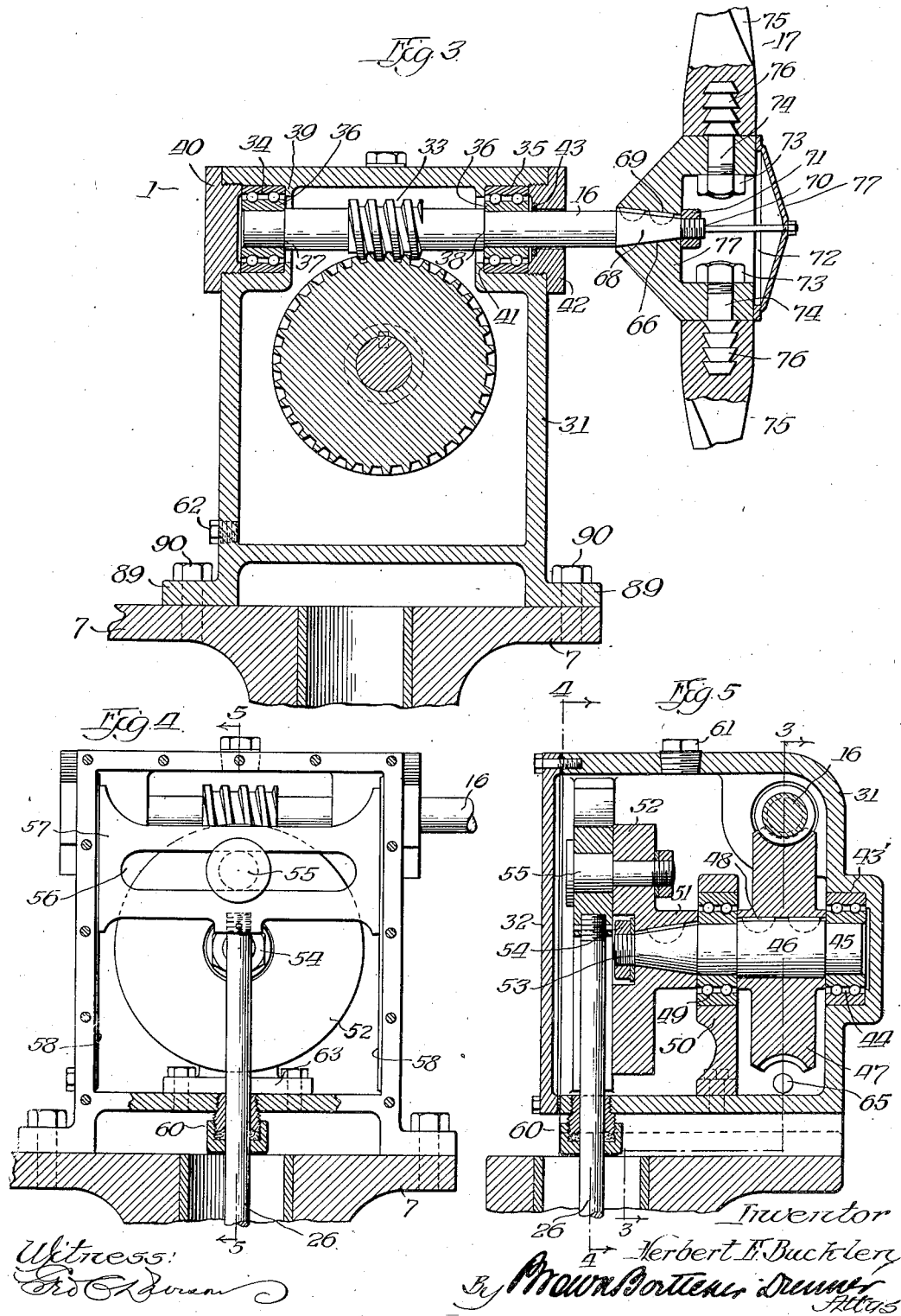

April 22, 1930.   H. E. BUCKLEN   1,755,422
WINDMILL DRIVE
Filed Dec. 30, 1925   3 Sheets-Sheet 3
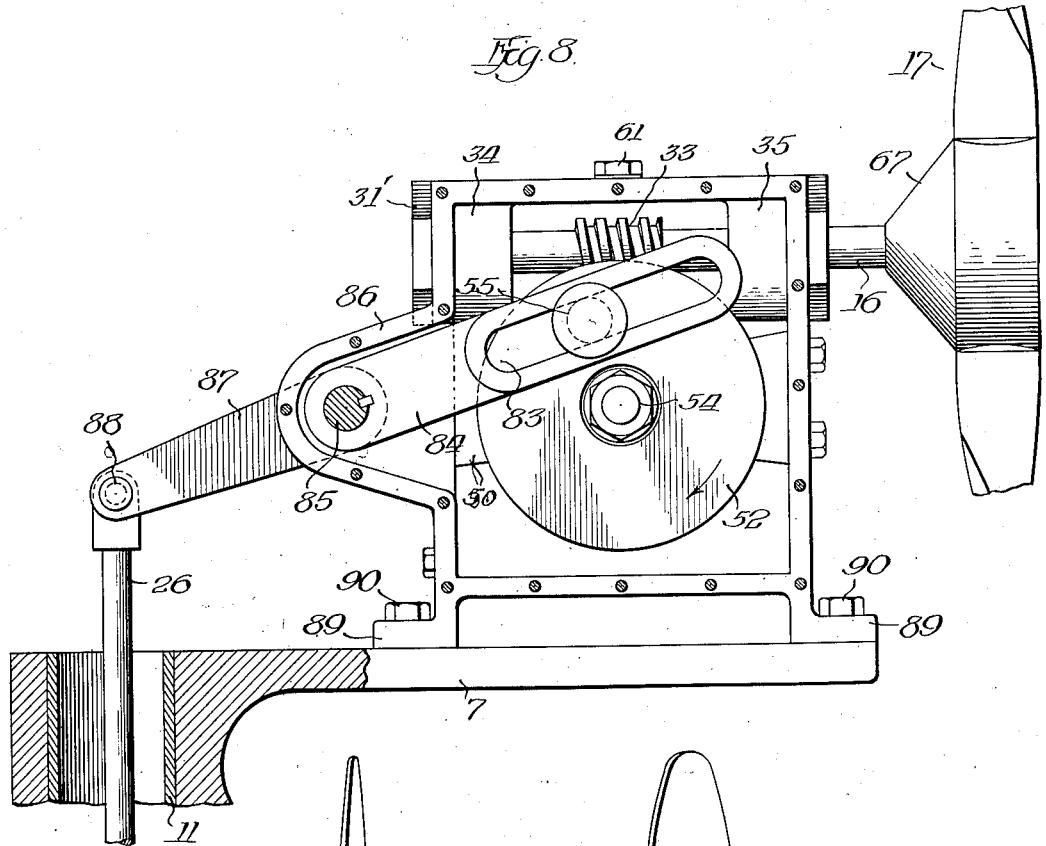
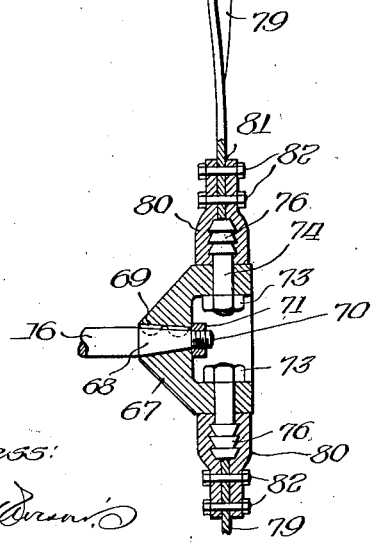
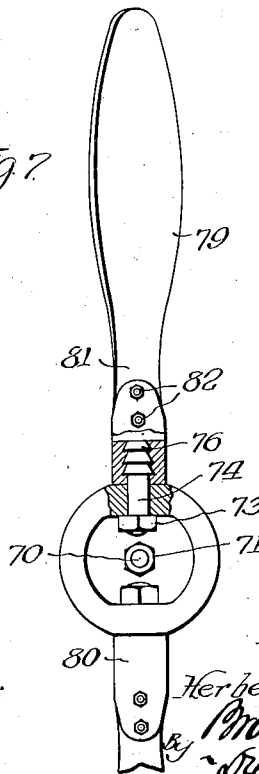

Patented Apr. 22, 1930

1,755,422

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

WINDMILL DRIVE

Application filed December 30, 1925. Serial No. 78,275.

My invention relates to wind driven pumping units, and the like. In wind driven pumping units as heretofore constructed, a circular wind wheel is geared through suitable motion changing mechanism to the usual pump rod which operates a piston or cup to raise water from a well, or the like.

Pumping wheels, as heretofore constructed, have had the fundamental defect of presenting too great an area to the wind to permit the same to be employed in high winds at the top of a tower without danger of destruction. Since the wheel could not be permitted to operate at high winds, it had to be made to do its work on or below moderate wind speeds. Another difficulty was the weight of the wheel. The weight limits the permissible speed.

Hence, prior wind wheel pumping units have been geared to the pump rod in such a manner as to develop the maximum permissible speed of pumping, namely, about sixty operations per minute upon such moderate winds, and the wheel has had to be moved out of the wind for greater wind speeds in order to save it.

But, such relatively high gearing together with the weight of the wheel, has introduced the further difficulty, namely, inability to operate upon low wind speeds.

I have conceived the possibility of employing instead of the well known wind wheel a new form of wind wheel or wind driven device, namely, the aeroplane propeller type of turbine. I have employed in my experimental work standard wooden aeroplane propellers used as driving turbine wheels, and I have devised a special form of metal turbine wheel embodying certain new features of construction, but based upon the aeroplane propeller.

I find that such turbine wheels in low winds rotate very much faster than do the conventional type of wind wheels. It presents much less surface, and much less resistance to the wind, and hence may remain in service in very high winds. As a result, the gear ratio may be made much lower, for example, ten to one, or twelve to one of the propeller shaft with respect to the pump rod or pump rock shaft. Hence the unit is operative for pumping in lighter winds than the devices of the prior art because the gear ratio is so arranged as to put very little resistance upon the wheel when it starts, and due to the fact that a propeller of this character offers very little head resistance to the wind, much higher wind pressures, that is, greater wind velocities may be successfully withstood. As a result, a pumping outfit embodying my invention is able to pump water or perform useful work over a much greater range of wind velocity than has heretofore been permissible or possible.

In order to acquaint those skilled in the art with the manner of constructing and operating a device embodying my invention, I shall now describe in connection with the accompanying drawings a specific embodiment of the same.

In the drawings:—

Figure 1 is a side elevational view partly in section showing the upper part of the tower and the operating head of a unit embodying my invention;

Fig. 2 is a front view of the propeller shown in Fig. 1;

Fig. 3 is a transverse vertical section on the line of the propeller shaft as viewed on the line 3—3 of Fig. 5;

Fig. 4 is a partial sectional and elevational view taken on the line 4—4 of Fig. 5;

Fig. 5 is a transverse section taken on the line 5—5 of Fig. 4;

Fig. 6 is a side elevation partly in section showing the construction of a modified form of wheel or propeller;

Fig. 7 is a front view partly in section of the same; and

Fig. 8 is a view like Fig. 4 showing a modified form of transmission between the propeller shaft and the rock shaft.

According to my invention I employ a worm and worm wheel gearing between the propeller shaft and the rock shaft for the dual purpose of providing a suitable gear reduction in a compact structure, and of minimizing the lost motion and noise which would otherwise be made by a gear reduction of the same extent if the same used spur gears.

The usual grinding noise which occurs in gears of the type heretofore employed upon reversal of motion of the pump rod is absent from the gearing of my invention.

As shown in Fig. 1, I mount the operating head 1 upon the top of a suitable tower 2, in this case an angle iron structure provided with suitable braces and having a cap or head 3 at its upper end supported on the corner posts 4, 4, which preferably are made of commercial angle bars. The cap member 3 is provided with a race way 5 for receiving the ball bearings 6. The rotatable platform member 7 has a tubular extension 8 terminating in a water shed flange 9, beneath which there is a conical bearing pin for cooperating with the ball bearings 6. The tubular neck member 8 receives the upper end of a hollow shaft or pipe 11, which hollow shaft or pipe is firmly secured in said neck or tubular extension 8. At its lower end the hollow shaft or tube 11 extends through a central bearing 12 which is connected to the corner posts 4 by suitable connections, such as the rods 13 connected to brackets 14. This central bearing 12 holds the lower end of the pipe or hollow shaft 11 in alignment with the bearing 6. A collar 15 is secured upon the lower end of the hollow shaft 11 to prevent axial displacement of the hollow shaft upwardly. The operating head 1 is mounted upon the platform 7 and it has a propeller shaft 16 extending from the top of the forward end thereof, and it has a suitable turbine wheel in the shape of a two-bladed propeller secured upon the forward end of the shaft 16, the disposition of the parts being such as to place the propelled 17 as far away from the tower as is required to clear the same and to prevent intereference of the same with wind current. A suitable tail vane 18 is mounted upon a light frame work or arm 19, which arm is pivoted in a bracket 20, preferably formed integral with the rear end of the platform 7. The arm or frame work 19 is connected by means of a chain or cable 21, which extends over suitable pulleys 22 and 23 through the interior of the hollow shaft or pipe 11, and is connected to a rod 24. The rod 24 passes through the annular joint or coupling 25 which is formed between the upper rod section 26 and the lower rod section 27. The upper rod section 26 is made in the form of a round shaft, preferably cold rolled steel, whereas the rod section 27 is preferably made of a wooden rod. An operating chain or cable 28 is connected to the lower end of the rod 24 and a pull upon the chain or cable 28 is adapted to pull the tail vane 18 towards the frame member 7 so as to set said vane 18 substantially parallel to the plane of the turbine wheel 17. By this means the wheel 17 may be taken out of the wind to stop the action of pumping. The vane 18 may be held in definite position with respect to the bracket 20 as by means of a spring 30. The spring holds the tail vane 18 against a stop so that the vane and the platform 7 are substantially rigid up to the limit of the strength of the spring 30.

The operating head 1 comprises a housing 31 having a side closure or plate 32 to form a fluid tight box enclosing the operating parts between the propeller shaft 16 and the plunger rod 26.

The propeller shaft 16 has a worm 33, which may be formed integral or made as a separate member, and this worm 33 is disposed between the two ball bearings 34 and 35, these bearings preferably being adapted to take the radial load and thrust in either direction. The inner races 36 bear against shoulders 37 and 38 so as to hold the worm against endwise movement. The outer race of the bearing 34 is confined between an internal flange 39 and a screw plug 40 which closes the bore in which the bearing 34 is seated and seals it off from the outside. Likewise, the bearing 35 has its outer race confined between an internal flange 41 and an outer plug 42, which plug 42 may be packed as by means of a suitable gasket, or may have an internal felt washer at 43, as indicated in Fig. 3.

The housing 31 has a pocket 43' in its side wall in which is seated a ball bearing 44, this bearing being also preferably of double row ball type, or otherwise adapted to take end thrust. The inner ring is seated upon the reduced end 45 of the shaft 46. The central part of the shaft 46 has the worm wheel 47 keyed thereupon, as indicated at 48. The shaft is also supported in the ball bearings 49 seated in a web 50 on the inside of the housing 31. The inner race of the bearing 49 is confined between the hub of the worm wheel 47 and the hub of the crank disc 52, the crank disc having the hub thereof keyed to the tapered shank 53 of the shaft 46. In addition to the taper fit the hub of the crank disc 52 is keyed to the tapered shank and a nut 54 is threaded upon the reduced outer end of the shank 53 to hold the crank disc firmly upon the end of the shaft. The crank disc 52 in turn has the crank pin 55 secured thereto, the crank pin having suitable shoulders and an extending stud to secure it upon the disc 52, the main shank of the crank pin 55 lying in a slot 56 formed in the cross head member 57. The cross head 57 is preferably guided in suitable ways 58, 58 in the sides of the housing 31. These ways may be made integral with the housing or may be made as separate parts secured to the housing. A suitable square box may be provided between the pin 55 and the cross head 57, as is the well known practice in the construction of a cross head of this kind, which is generally termed a scotch yoke. The cross head or scotch yoke is connected directly to the plunger rod 26 and this plunger rod extends out through the bottom of the housing 31, a suitable stuffing box or packing gland 60 preventing the escape of lubricant with which the interior of the case 31 is filled. A suitable filling plug 61 is provided at the top of the casing and a draining plug 62 at the side, so that the lubricant may be introduced and drained, as desired.

The web 50 may be made integral with the interior of the housing 31 and extends completely across the same to form a well for lubricant to insure continuous lubrication of the worm 47 regardless of leakage past the stuffing box 60, or the web 50 may be merely a pedestal as shown at 63 bolted to the bottom of the housing or box 31. Preferably I extend the web 50 completely across the side of the casing to form such a well for lubricant and provide a separate drain plug 65 for draining the well in which the worm wheel 47 fits.

The propeller 17, which serves as a turbine wheel, is secured to the shaft 16 by means of a tapered socket 66 in the hub member 67, said tapered or conical socket fitting upon the conical shank 68 of the shaft 16. These parts are keyed together, as indicated at 69, and the two tapered parts are held against axial displacement with respect to each other by means of the stud 70 formed on the forward part of the tapered portion 68 and the nut 71 which bears against the hub 67. The hub 67 has a recess 72 in which are disposed first, the jam nut 71 for holding the hub on the propeller shaft 16, and next, the clamping nuts 73, 73 which are threaded upon studs 74, 74, which studs in turn are secured to the blade members 75, 75. The blade members 75, 75 are in the present case made of duralumin or aluminum casting with the upper ends or heads 76 of the studs cast in the hub or base portion of the blades 75. These heads 76 are preferably provided with a series of shoulders, as shown in Fig. 3, to secure a firm grip of the studs upon the hubs of the blades.

The recess in the hub is preferably closed by a suitable cap or cover 77, although this is optional. It is to be noted that the bases of the blades 75 are seated on seats 78 which are normal to the axis of the blades 75. This manner of mounting the blades on the hub permits angular adjustment of the blades to secure the best disposition of the blades for a given wind velocity or for controlling the speed of the turbine wheel.

In Figs. 6 and 7 I have illustrated a modified form of propeller in which the blades 79 are made of thin metal of uniform or substantially uniform thickness, such as sheet metal or plate, these plate blades being secured at their bases in hubs 80. The hubs 80 are slotted at their outer ends as indicated at 81 to receive the base of the blade, a pair of clamping bolts passing through the metal on each side of the slots and through holes in the blades. In this way the propeller is built up more economically and at greater facility of manufacture than by forming the blades in a single unitary piece or forming the propeller unitary. The blades are adjustable to provide a proper angular setting to the wind.

In Fig. 8 I have shown a modified form of jack mechanism. In this form the crank pin 55 instead of operating in a scotch yoke operates out of the rocking lever 84, which lever is keyed on a shaft 85 mounted in an extension 86 of the housing 31'. One end of the shaft 85 projects outside of the housing extension 86 and has connected thereto an external arm 87 which is connected to the plunger rod 26 by a suitable pin joint 88. Instead of having a wrist pin at 88, a connection through a suitable fabric strip, or the like, may be made to avoid the necessity for lubrication. The crank disc 52 is constructed as shown in the previous modification of Figs. 3 to 5, inclusive, and the worm 33 and worm wheel 47 are arranged in the same manner as shown in said preferred modification. The box or housing 31 or 31' is in each case mounted upon the platform 7 by means of the bracket 89 and suitable bolts 90. The joint where the shaft 85 passes through the side of the housing extension 86 may be closed by means of a suitable stuffing box.

It will be observed that there is a desirable relation in having the worm 33 disposed above the worm wheel in order to bring the shaft 16 and hence the axis of the propeller 17 as far above the tower and supporting structure as possible. Also, this housing and shaft 16 should be set forward on the platform so as to permit the propeller to clear the tower in all positions. The worm and worm wheel and motion changing parts, which are subjected to wear, are enclosed in a housing which is made oil tight and filled with lubricant. As shown in Fig. 8, the housing projects forwardly from the axial hollow shaft 11 placing the propeller in the most advantageous position. It will be apparent, of course, that the arm 87 need not be extended rearwardly but might, if desired, be extended forwardly to bring the vertical hollow shaft 11 closer to the center of the mechanism in the housing 31'. In other words, the lever 84, instead of being of the first class, would then be of the second class, or perhaps even of the third class. The leverage shown in Fig. 8 is highly advantageous, where the disc 52 runs in the clockwise direction, since the lifting stroke for lifting the pump rod 26 is made when the pin 55 is furthest away from the pivot 85 in the slot 83, so that maximum power for lifting is provided and on the return stroke the pin 55 is in that part of the slot 83 which is closer to the pivot 85.

Obviously this arrangement will result in the plunger rod 26 having a fast down movement and a slow up movement. It is a decided advantage from the standpoint of "break away" or starting torque to give the working stroke the benefit of the leverage or torque and thus facilitate an easy starting under load. Furthermore, the quick return on the idling stroke produces more efficient pump action.

It is believed that the operation of the device will be apparent from the foregoing detail description. It is desirable that the wheel be able to turn in very light winds so that pumping may be carried on, even though slowly, in light winds, since a device of this character should, for maximum usefulness, be able to operate continuously even though the operation be not at maximum speed.

Also, due to the relatively small head resistance to the wind of a device of this character, a much higher wind velocity may be withstood.

When it is desired to stop the operation of pumping, the tail vane 18 is swung over into a plane substantially parallel with the plane of the wheel 17 and the operation of the device is then discontinued. Due to the swivel joint 25 in the pump rod, and the swivel joint 90 in the cable 28, the operating head and tail vane are free to swing about in any desired direction.

Referring more particularly to Fig. 8, I shall now proceed to describe the advantages of locating the gearing and the associated mechanism on a support between the air driven member or impeller and the tower.

It is well known that when a stream of air comes into the zone of a solid or the like, the stream splits into parallel streams which travel around the solid and recombine upon reaching the other end of the solid. This results in eddy currents forming around the thing or solid which in reality constitutes dead air pockets. In aeroplane practice this feature constitutes one of the principal factors considered in designing the wings of the plane.

Now I have observed that this phenomenon is also true in the case of towers such as I disclose. Obviously, the tower resists the moving streams of air thus causing dead air pockets to be formed in the vicinity of the tower. Also since the ordinary air driven member is mounted in proximity to the upper end of the tower it must of necessity move thru these dead air pockets which resist to a high degree any movement of this member.

Furthermore, I have found that when an air driven impeller is rotating under ideal conditions it moves as a unit so to speak with the stream of air actuating it. In reality the impeller screws or threads its way thru the moving stream of air. That is to say, the air in striking the blades of the impeller causes the impeller to have a screw-like action as far as the stream of air is concerned. Since any force imparted to a medium like air is transmitted thru the air at a given rate per second, it must necessarily follow that in order for the driven member or impeller to turn freely the force exerted on one side of each blade of the impeller must be transmitted by the blade to the other side substantially undiminished. If this condition does not exist the impeller will not turn freely and will not move as a unit with the stream of air.

From the foregoing it will now be apparent that the dead air pockets in the vicinity of the tower resists movement of the impeller inasmuch as the impeller heretofore has been mounted in proximity to the tower so that it is compelled to move thru the adjoining pockets or eddy currents. These pockets resist and deaden the initial movement of the impeller. Also once the impeller is turning, its blades in cutting these dead air pockets retard its movement and result in the impeller as a whole having a jerky movement.

Another bad feature of mounting the impeller in proximity to the tower, is that the blades in moving past the tower cause a humming noise. One standing in the vicinity of the tower can clearly tell each time the lower blade clears the tower by the noise created due to the resultant rush of air.

Thru my present invention it is possible to mount the impeller so that it does not have to move thru the dead air pockets around the tower. In fact, I mount the impeller sufficiently far from the tower as to locate it in the path of the rushing stream of air before this stream splits up into parallel streams. This subjects the impeller to the full force of the air and substantially eliminates the previous loss due to the air pockets. Also since the impeller is not subjected to the frictional effect of the dead air pockets it can be actuated by much lower winds than heretofore, thus enabling the wind mill to take more power from the wind and as a whole greatly increasing the efficiency of the structure.

In accordance with the preferred embodiment of my invention it will be noted that I have provided a revolvable support member with a lateral extension upon which the gear casing is mounted. This casing (Fig. 8) is mounted sufficiently far from the impeller to locate the impeller in a position where it is free to rotate independently of the eddy currents and dead air pockets around the tower. Obviously, by utilizing the space separating the plunger rod and the impeller for accommodating the gearing and leverage, I not only provide a more compact structure, but also greatly reduce the size of the parts required. For example, the impeller shaft is of a minimum length and hence has less play and requires less bearing support. Moreover, the length of the leverage is reduced thus enabling a more effective transmission of force to the plunger rod 26.

It will be further noted that I preferably make the support in the form of a tubular sleeve having a diameter considerably less than that of the upper end of the tower. This construction reduces the air pockets located immediately below the extension or frame member 7 to a minimum. In any event, however, the impeller should be mounted sufficiently far from the support or tubular extension 8 to enable it to at all times be clear of any dead air pockets. By making the support 8 smaller than the tower it is possible to mount the impeller nearer to the support than it would be if the support had the same diameter as the top of the tower thus reducing the length of the member 7 to a practical dimension and resulting in the lever 87 being ideally situated.

I do not intend to be limited to the details shown and described.

I claim:—

1. In combination, a gear case closed for lubricant, a horizontal shaft having bearings in opposite side walls of said gear case, said bearings being disposed within the gear case, said shaft projecting out through the gear case and being adapted to support a turbine propeller wheel thereupon, a worm between said bearings on said shaft, a transverse worm wheel shaft, a worm wheel on said transverse shaft, bearings for the shaft on each side of the worm wheel, said bearings being disposed within the gear case, a crank member mounted on said worm wheel shaft, said crank member having a crank pin, a slotted oscillating lever co-operating with the crank pin, a rock shaft for the oscillating lever, said lever projecting through the casing, and an external arm connected to said lever.

2. In combination, a closed gear casing having a horizontal driving spindle disposed in the upper portion thereof, bearings within the gear case on each side of said spindle, a worm on the spindle, said spindle projecting through the forward wall of the gear case and being adapted to support a turbine propeller wheel, a transverse worm wheel shaft having two bearings disposed within the gear case, a worm wheel on said shaft between said bearings, a crank member having a hub secured upon said worm wheel shaft and a crank pin projecting therefrom, and a member mounted within the gear case and operatively associated with the crank 10, said last mentioned member having an operating member projecting through the gear case.

3. In combination, a tower, a gear casing carried by the said tower, a driving wheel associated with the said casing, a shaft connected to the said driving wheel, a worm carried by said shaft, a worm wheel meshing with said worm, a shaft for said worm wheel in said casing, a crank comprising a circular disc having an eccentric pin, said crank being connected to said worm wheel shaft, a lever pivoted to said casing including a slotted leg adapted to embrace said eccentric pin, and a plunger rod connected to the other leg of said lever and extending down through said tower.

4. In combination, a tower, a support member revolvably mounted on the top of said tower, a tail vane connected to said support member, a gear casing carried by the said support member, a driving wheel associated with said casing, a shaft upon which said wheel is mounted and extending into said casing, a worm carried by said shaft, a worm wheel meshing with said worm, a shaft for said worm wheel in said casing, a crank comprising a circular disc having an eccentric pin, said crank being connected to said worm wheel shaft, a lever pivoted to said casing including a slotted leg adapted to embrace said eccentric pin, a plunger rod connected to the other leg of said lever and extending down through said tower and a tube connected to said support member and extending downwardly in the tower for surrounding said plunger rod.

5. In combination, a tower, a gear casing carried by the said tower, a driving wheel associated with said casing, a shaft upon which said wheel is mounted and extending into said casing, a worm carried by said shaft, a worm wheel meshing with said worm, a shaft for said worm wheel journaled in said casing, a partition formed integral with said casing serving as a mounting for a portion of said worm wheel shaft, said partition forming a well for lubricant and being adapted to keep said lubricant in contact with said worm wheel, a plunger rod extending up through the tower, and means connecting the said worm wheel to the plunger rod.

6. In combination, a tower, a two bladed air driven impeller mounted on top of said tower, and means for supporting the impeller away from the tower to prevent it from cutting any of the air pockets about the tower and for enabling it to get the full force of air currents before they are caused to be split up into parallel streams by the tower.

7. In combination, a tower, a two bladed air driven impeller mounted on top of said tower, means for supporting the impeller away from the tower to prevent it from cutting any of the air pockets about the tower and for enabling it to get the full force of air currents before they are caused to be split up into parallel streams by the tower, a member supported by said tower and actuated by said impeller, and mechanism mounted on said supporting means between the member and said impeller for operatively connecting them.

8. In combination, a tower, a support member mounted on said tower including a platform extending laterally from the tower, an air driven member associated with said support, a plunger rod extending through said tower and support member, and operating mechanism associated with said platform for connecting said air driven member to said rod, said air driven member being supported by the platform away from the top of said tower to prevent it from cutting any of the dead air pockets about the tower and support member.

9. In combination, a tower, an air driven impeller mounted on top of said tower, means for supporting the impeller, a plunger rod extending through said tower, gearing carried by the supporting means to one side of said rod and driven by said impeller, and mechanism for actuating said rod including a lever disposed on one side of the rod, said gearing and lever being arranged in longitudinal sequence between the impeller and the rod, said lever having one end connected to said gearing and the other connected to said rod.

10. In combination, a tower, a two bladed air driven impeller mounted on top of said tower, and means for supporting the impeller away from the tower to prevent it from cutting any of the air pockets about the tower and for enabling it to get the full force of air currents before they are caused to be split up into parallel streams by the tower, said supporting means including a tubular member connected to the top of the tower having a cross section considerably smaller than that of the top of the tower.

11. In combination, a tower, a support member mounted on said tower including a platform extending laterally from the tower, an air driven member associated with said support, a plunger rod extending through said tower and support member, operating mechanism associated with said platform for connecting said air driven member to said rod, said air driven member being supported by the platform, said mechanism including a shaft connected to the driving wheel, a worm carried by said shaft, a worm wheel meshing with said worm, a crank comprising a circular disc having an eccentric pin and a lever pivotally supported including a slotted leg adapted to embrace said pin, said plunger rod being connected to the other end of said lever, and a gear casing for said worm and worm wheel mounted on said platform between the air driven member and the plunger rod and to which said lever is pivotally attached.

12. In combination, a tower, a gear casing carried by said tower, a driving wheel associated with the casing, a shaft connected to the said driving wheel, a worm carried by said shaft, a worm wheel meshing with said worm, a shaft for said worm wheel in said casing, a crank comprising a circular disc having an eccentric pin, said crank being connected to said worm wheel shaft, a plunger rod extending through said tower, and means comprising a variable motion connection for connecting the plunger rod to the said eccentric pin.

13. In combination, a tower, a rotatable support member revolvably mounted on the top of said tower, a tail vane connected to said support member for rotating it, a gear casing carried by the said support member, a driving wheel associated with said casing, a shaft upon which said wheel is mounted and extending into said casing, a worm carried by said shaft, a worm wheel meshing with said worm, a crank comprising a circular disc having an eccentric pin, said crank being connected to said worm wheel, a plunger rod extending through said tower, and movable means connected to the casing for connecting the plunger rod to the eccentric pin.

14. In combination, a tower, a two-blade helical screw air driven impeller rotatably mounted on said tower and capable of relatively high speed, a device driven by said impeller and a mounting for the impeller for supporting it away from any of the air pockets about the tower and for enabling it to get the full force of high speed air currents before they are disturbed by the tower.

15. In combination, a gear casing, a drive shaft, an impeller on the shaft, a disc mounted in the casing to rotate on a horizontal axis, a speed reducing worm drive between the disc and the shaft, a lever structure mounted intermediate its ends on the casing for rocking movement on a horizontal axis, a pump rod connected to one arm of the lever structure to be reciprocated thereby, the other arm of the lever structure being slotted, and a crank pin secured to the disc and operating in said slotted arm.

16. In a wind driven device, a pivot shaft adapted to be mounted in a supporting tower, a turn-table mounted adjacent one end of the shaft and extending forwardly therefrom a substantial distance, a power absorbing device mounted on the turn-table forwardly of the shaft, a drive shaft therefor, and a wind driven screw propeller of the aeroplane type secured on the drive shaft and disposed beyond the outer end of the turn-table in a position to minimize the disturbing effect of the supporting tower upon the air currents acting upon the propeller during high wind velocities.

17. In combination, a tower, a helical screw air driven impeller of the aeroplane type rotatably mounted on said tower and adapted to obtain power from the wind, and a power translating device associated with said impeller and operated thereby for translating the energy in the wind into transmittable form.

18. A wind driven power system wherein a wind motor is mounted on a tower and drives a shaft extending vertically through the tower and wherein the power is transmitted from the motor to the shaft through a speed reducing gearing mechanism carried by the tower, characterized by the fact that the gear mechanism is located between the motor and the center of the tower and is spaced a greater distance from the center of the tower than from the motor.

19. A wind driven power system wherein a wind motor is mounted on a tower and drives a shaft extending vertically through the tower and wherein the power is transmitted from the motor to the shaft through a speed reducing gearing mechanism carried by the tower, characterized by the fact that the gear mechanism is located between the motor and the center of the tower and is spaced a substantial distance from the center of the tower, and a lever extending radially of the shaft towards the wind motor and pivoted at one end to the shaft connects the shaft to the gear mechanism.

20. In a wind driven power system, a supporting tower, a platform mounted on the tower, a wind driven motor extending beyond the platform, power translating means mounted on the platform adjacent the edge thereof and spaced from the center of the platform, and a driving connection between the wind motor and the power translating means.

In witness whereof, I hereunto subscribe my name this 26th day of December, 1925.

HERBERT E. BUCKLEN.